(No Model.)
R. MAYER.
CHOPPING KNIFE.
No. 527,002. Patented Oct. 2, 1894.
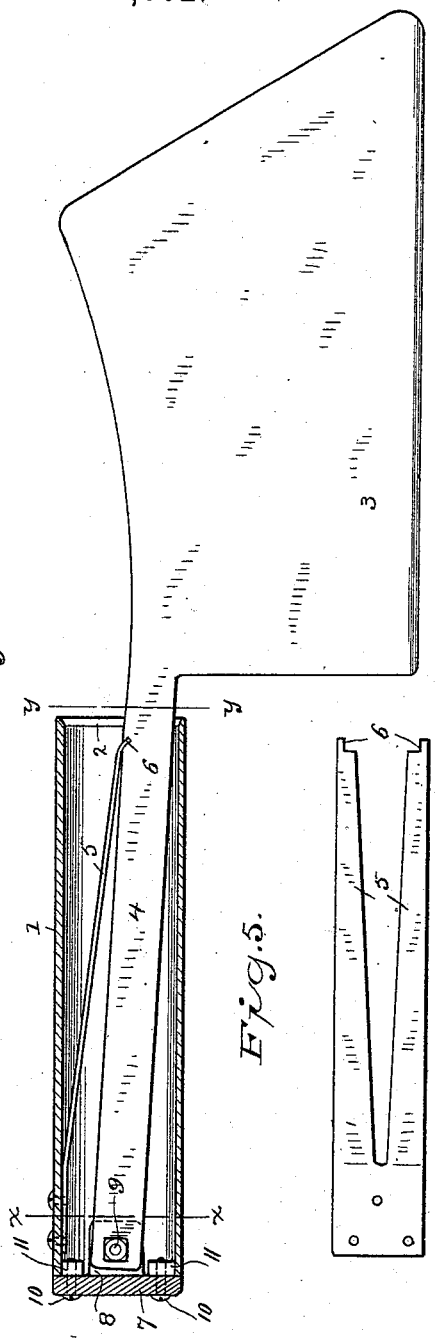
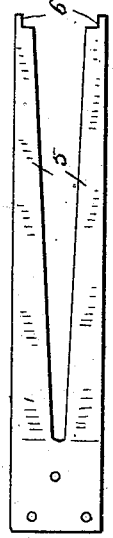
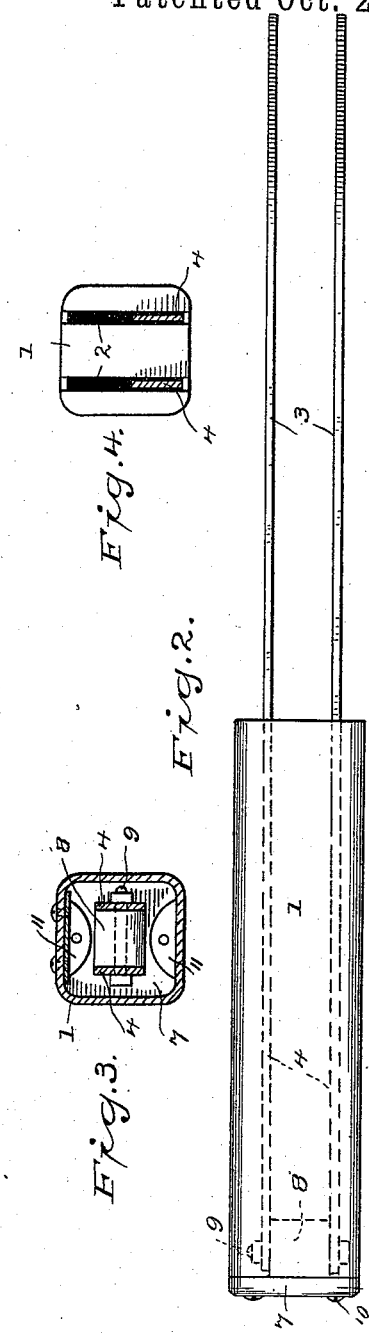
WITNESSES
INVENTOR
Reinhold Mayer
By
A. M. Wooster
Atty.

UNITED STATES PATENT OFFICE.

REINHOLD MAYER, OF BRIDGEPORT, CONNECTICUT.

CHOPPING-KNIFE.

SPECIFICATION forming part of Letters Patent No. 527,002, dated October 2, 1894.

Application filed November 29, 1893. Serial No. 492,374. (No model.)

*To all whom it may concern:*

Be it known that I, REINHOLD MAYER, a citizen of the United States, residing at Bridgeport, in the county of Fairfield and State of Connecticut, have invented certain new and useful Improvements in Chopping-Knives; and I do hereby declare the following to be a full, clear, and exact description of the invention, such as will enable others skilled in the art to which it appertains to make and use the same.

My invention has for its object to provide a chopping knife especially adapted for butchers' use in the operation of chopping small quantities of sausage, hamburger steak, &c. In an implement of this class it is of course desirable to have a plurality of cutters as the time required in chopping up a quantity of meat is very much reduced thereby and it is furthermore necessary that the cutters should be made yielding so as to provide for inequalities in the surface of the chopping block and for blows delivered when the implement is not held plumb, it being of course impossible in use to hold the chopper so carefully that every blow shall be delivered exactly in the vertical plane. In order to provide an implement of this class which shall be simple, inexpensive to produce, and which shall greatly reduce the labor of chopping up small quantities of meat, and shall moreover be easy to clean and sharpen, I have devised the novel chopping knife which I will now describe referring by numbers to the accompanying drawings forming part of this specification, in which—

Figure 1 is a longitudinal section of the handle of my novel chopping knife showing one cutter and its spring in elevation; Fig. 2, a plan view of my novel chopper; Fig. 3, a section on the line *x x* in Fig. 1 looking toward the left; Fig. 4, a section on the line *y y* in Fig. 1 looking toward the left, and Fig. 5 is a plan view of a spring adapted for a two bladed chopper.

1 denotes the handle which is made of any suitable material as for example sheet metal and is provided at its forward end with slots 2.

3 denotes the cutters or chopping blades which lie parallel and are provided with shanks 4 which pass into the handle through slots 2, and are pivoted at the base of the handle.

In practice I employ a plurality of cutters and in the present instance have shown two.

5 denotes the springs which are preferably blanked out from a single piece of metal that is the springs all unite in a single base which is riveted to the upper side of the handle, the forward ends of said springs curving downward and resting upon the backs of the cutters.

6 denotes lugs formed at the extreme forward ends of the springs which are curved down on the outer sides of the shanks whereby the springs are retained in position in use. The base of the handle is preferably closed by a cap 7 which is provided on its inner side with a hub 8 to which the inner ends of the shanks of the cutters are pivoted by means of a removable bolt 9. The cap is secured to the handle in any suitable manner for example by screws 10 which engage bosses 11 on the inner side of the handle. In assembling the springs are preferably first secured in place. The shanks of the cutters are then passed into the slots and down through the handle until the cutters rest upon the end of the handle. This will permit the lower ends of the shanks to project through the handle. In this position the cutters may be readily pivoted to the hub by means of removable bolt 9. Having secured the cutters to the hub the cap is moved forward to place throwing the cutters slightly forward from the handle as shown in the drawings. The cap is then secured in place by means of screws engaging bosses 11, or in any ordinary or preferred manner.

It will be seen that the action of the springs is to throw the cutters downward and that when a blow is struck the springs will yield more or less so that the blow is a yielding blow under all circumstances and each cutter will find its proper level. This makes it perfectly practicable to use the implement upon an uneven chopping block and if a sidewise or glancing blow is struck no damage will result to the implement.

Having thus described my invention, I claim—

1. The combination with a plurality of parallel cutters having shanks 4, of a handle provided with slots at its forward end through which the shanks pass, a hub at the base of the handle to which the shanks are pivoted and springs within the handle which bear upon the backs of the cutters and permit the latter to yield in use.

2. The handle having slots at its forward end and bosses 11 at its rear end and a cap secured to the handle by screws engaging the bosses and having a hub 8, in combination with a plurality of cutters having shanks which pass through the slots and are pivoted to the hub and springs secured to the top of the handle and bearing upon the tops of the cutters as and for the purpose set forth.

In testimony whereof I affix my signature in presence of two witnesses.

REINHOLD MAYER.

Witnesses:
A. M. WOOSTER,
SUSIE V. RICHARDSON.